United States Patent Office 3,542,543
Patented Nov. 24, 1970

3,542,543
NICKEL BASE BRAZING ALLOY
Reed E. Yount and Donald L. Keller, Cincinnati, Ohio, assignors to General Electric Company, a corporation of New York
No Drawing. Filed Jan. 2, 1969, Ser. No. 788,601
Int. Cl. C22c 19/00
U.S. Cl. 75—171          3 Claims

ABSTRACT OF THE DISCLOSURE

A nickel base-Cr—Si type brazing alloy particularly useful with nickel base superalloys includes Mo and Fe for solid solution strengthening in a careful balance which avoids inclusion of Co at more than about 2 weight percent to maintain the brazing temperature in a range lower than about 2300° F. The elements B and Pd are avoided to inhibit erosion of the base metal and W is avoided because of its effect on melting temperature in this combination.

---

Improvements in nickel base alloys of the type sometimes referred to as superalloys have included the development of certain oxide dispersion-strengthened superalloys. One of the originally reported forms of this material is sometimes referred to as TD-nickel high temperature alloy. In this form, a small amount of thoria is dispersed in nickel in order to provide improved high temperature characteristics.

Another thoria dispersion-strengthened nickel base alloy is the variety which includes about 20 weight percent chromium along with nickel. This form sometimes is referred to as TD-nickel-chromium. Such an alloy has somewhat different characteristics than the TD-nickel alloy, with higher strength at intermediate elevated temperature along with improved oxidation resistance. When used in a structure which is to be joined by brazing, it is desirable to braze the cooperating members at a temperature lower than that which would affect the mechanical properties of the alloy in a manner adversely to its intended purpose.

It is a principal object of this invention to provide an improved brazing alloy for joining oxide dispersion-strengthened nickel base superalloys by brazing at a temperature below about 2300° F.

Another object is to provide such an improved brazing alloy based on nickel and including a careful balance of the elements Mo and Fe in a Ni—Cr—Si matrix in the absence of erosive elements.

These and other objects and advantages will be more readily understood from the following detailed description and examples which are typical of and not intended to be limiting on the scope of the present invention as can be interpreted by metallurgists.

The above objects can be attained through the provision of a brazing alloy based on nickel and having a ratio of Fe to Mo of about 2:1 or more. More specifically, one form of the brazing alloy of the present invention consists essentially of, by weight, 6–11% Si, 18–22% Cr, 8–11% Mo, 19–22% Fe, with the balance essentially nickel and incidental impurities including a maximum of about 2% Co. The alloy is further characterized by the substantial absence of the elements B and Pd and avoidance of the use of W.

In the alloy of the present invention, the element Fe is specifically included in combination with Si for adjustment of the melting characteristics. However, Fe is specifically included in the alloy of the present invention as a solid solution substitute for such elements as Co which can be tolerated in substantial amounts in some brazing alloys but not in the alloy of the present invention.

The companion element with Fe in controlling of melting characteristics is the element silicon. However, although substantial amounts of silicon can result in erosive side effects during brazing, it has been found that up to about 11% Si is useful in the careful balance of the elements of the present invention.

The elements palladium and boron, sometimes included in other brazing alloys as melting point controls, are not included in the alloy of the present invention because of their erosive reaction with oxide dispersioned-strengthened nickel base alloys. In addition, boron forms a low melting eutectic with nickel at about 1750° F., too low for the intended operating service range for TD-nickel-chromium alloy.

Chromium is included in the range of about 18–22 weight percent in the balanced alloy of the present invention to provide oxidation resistance. Below about 18% Cr, the alloy was found to have relatively poor oxidation resistance; above about 22% Cr, excessively high brazing temperatures resulted.

With respect to the inclusion of Mo, amounts less than about 8 weight percent resulted in low-time stability. In addition, the inclusion of Mo at levels greater than about 11 weight percent alone or along with W, resulted in excessively high brazing temperature requirements.

Representative of the types of alloys which were prepared and tested in the evaluation of the present invention are those shown in the following Table I. The alloys were melted in an inert gas atmosphere after which they were cast and then pulverized prior to their being tested as brazing alloys.

TABLE I.—ALLOY COMPOSITIONS
[Nominal wt. percent, balance Ni and incidental impurities]

| | Si | Mo | Cr | Fe | Co | W |
|---|---|---|---|---|---|---|
| Example: | | | | | | |
| 1 | 10 | 9 | 20 | 21 | | |
| 2 | 6 | 9 | 21 | 20 | | |
| 3 | 4 | 9 | 22 | 22 | 1.5 | |
| 4 | 4 | 25 | 16 | | | 5 |
| 5 | 10 | | 19 | | | |

Typical of the alloys within the scope of the present invention are Examples 1 and 2 in the above Table I. These and their companion forms within the scope of the present invention were found to be capable of being used as brazing alloys at temperatures less than 2300° F.

Use of such a brazing alloy as that shown in Example 5 in Table I for joining TD-nickel-chromium alloy members has been seen to result in severe preferential internal oxidation at the joint interface for example, after 400 hours exposure at 1800° F. in air. Such testing of the alloy of the present invention, for example, as represented by Examples 1 and 2, have avoided such an internal oxidation occurrence. In general, the alloy of the present invention improves the oxidation resistances of such a joint and inhibits thoria agglomeration in the 1800–2200° F. range.

Testing of the alloy of the present invention included the testing of brazed overlap shear specimens of 0.060" thick TD-Ni-20%-Cr material. The overlap was about 0.012" with a 0.005" gap. The data of Table II is typical of that obtained.

TABLE II.—AVERAGE TENSILE DATA, AT 1,800° F.

| | Load at fracture, lbs. | Indicated shear strength, K s.i. | Base metal stress at failure, K s.i. |
|---|---|---|---|
| Example: | | | |
| 1 | 49, | 7.6 | 17.3 |
| 3 | 420 | 6.8 | 14.0 |
| 4 | 359 | 5.2 | 12.1 |

In the above table, the term K s.i. refers to "thousands of pounds per square inch." As can be seen by these data, the alloy of the present invention as represented by Example 1 is significantly better than the alloys of Examples 3 and 4. In Example 3, it should be noted that although silicon is normally included for its effect on melting point, in the particular combination of the alloy of the present invention, it has a significant effect on strength. With respect to Example 4, the smaller amount of silicon along with more than 3 times the weight percent of the combination of Mo and W, in the absence of Fe, not only greatly increases the alloy melting point but also results in a brazed joint significantly weaker than that which results from use of the alloy of the present invention.

What is claimed is:

1. A nickel base brazing alloy consisting essentially of, by weight:
6–11% Si;
18–22% Cr;
8–11% Mo;
19–22% Fe; and
balance essentially Ni and incidental impurities including a maximum of about 2% Co;
the alloy further characterized by the substantial absence of B and Pd.

2. The alloy of claim 1 in which:
Si is 6–7%;
Mo is 8–10%; and
Cr is 20–22%.

3. The alloy of claim 1 in which:
Si is 9–11%;
Mo is 8–9%; and
Cr is 19–22%.

References Cited

UNITED STATES PATENTS 3,482,967  12/1968  Redden _____ 75—171
2,868,639   1/1959  Gonser _____ 75—171

RICHARD O. DEAN, Primary Examiner